(12) United States Patent
Becker et al.

(10) Patent No.: US 9,573,765 B2
(45) Date of Patent: Feb. 21, 2017

(54) BELT-CONVEYING INSTALLATION, METHOD FOR OPERATING THE SAME, AND USE THEREOF

(75) Inventors: Norbert Becker, Röttenbach (DE); Christof Brewka, Littleton Highlands Ranch, CO (US); Christian Dirscherl, Erlangen (DE); Torsten Hellmuth, Erlangen (DE); Wolf Krieger, Berlin (DE); Horst Minor, Moers (DE); Peter Sehl, Denver, CO (US)

(73) Assignees: SIEMENS AKTIENGESELLSCHAFT, München (DE); THYSSENKRUPP INDUSTRIAL SOLUTIONS AG, Essen (DE); THYSSENKRUPP INDUSTRIAL SOLUTIONS (USA), INC., Greenwood Village, CO (US)

(*) Notice: Subject to any disclaimer, the term of this patent is extended or adjusted under 35 U.S.C. 154(b) by 0 days.

(21) Appl. No.: 14/240,526

(22) PCT Filed: Aug. 2, 2012

(86) PCT No.: PCT/EP2012/065123
§ 371 (c)(1),
(2), (4) Date: May 22, 2014

(87) PCT Pub. No.: WO2013/026672
PCT Pub. Date: Feb. 28, 2013

(65) Prior Publication Data
US 2014/0291126 A1    Oct. 2, 2014

(30) Foreign Application Priority Data
Aug. 23, 2011 (EP) .................... 11178487

(51) Int. Cl.
*B65G 23/04* (2006.01)
*B65G 15/28* (2006.01)
*B65G 23/22* (2006.01)

(52) U.S. Cl.
CPC ............. *B65G 15/28* (2013.01); *B65G 23/22* (2013.01)

(58) Field of Classification Search
CPC ................................. B65G 15/28; B65G 23/22
(Continued)

(56) References Cited

U.S. PATENT DOCUMENTS 2,591,089 A * 4/1952 Moon ................ B65G 23/34
198/835
3,149,273 A * 9/1964 Wallace ................ H02P 5/46
318/70

(Continued)

FOREIGN PATENT DOCUMENTS

AU        558538        2/1987
CA       2640018        5/2009
(Continued)

OTHER PUBLICATIONS

Siemens, "Advanced Drive System Saves Up to 20% Energy," Order No. A19100-E273-B198-X-7600, Aug. 22, 2011, 12 pages.
(Continued)

*Primary Examiner* — William R Harp
(74) *Attorney, Agent, or Firm* — Henry M. Feiereisen LLC (57) ABSTRACT

A belt-conveying installation has at least one carrying structure, a conveying belt and at least one drive apparatus for driving the conveying belt. The drive apparatus includes at least one drive shaft, at least one drive-shaft-bearing arrangement, at least one drive roller and at least one independently excited drive motor in the form of a fre-
(Continued)

quency-converter-fed alternating-current synchronous motor with a stator and a rotor. The drive shaft and the at least one drive motor are connected to one another without any gearing, and the rotor and drive shaft are arranged coaxially, each drive shaft being guided through at least one rotor. The belt-conveying installation can be operated and used for heavy industry, in particular for the extractive or mining industry.

25 Claims, 5 Drawing Sheets

(58) Field of Classification Search
USPC .......................................... 198/835, 780–791
See application file for complete search history.

(56) References Cited

U.S. PATENT DOCUMENTS

| | | | | |
|---|---|---|---|---|
| 4,206,840 | A | * | 6/1980 | Hanson ............... B65G 41/008 198/301 |
| 4,960,186 | A | * | 10/1990 | Honda ......................... 187/254 |
| 5,088,569 | A | * | 2/1992 | Checcucci ........... G01G 11/003 177/145 |
| 5,148,893 | A | * | 9/1992 | Vertesy et al. ................. 254/362 |
| 5,711,221 | A | * | 1/1998 | Compera ............ B41F 13/0045 101/216 |
| 5,950,797 | A | * | 9/1999 | Aulanko et al. .............. 198/330 |
| 6,161,674 | A | * | 12/2000 | Aulanko et al. .............. 198/330 |
| 6,808,057 | B1 | * | 10/2004 | Nirmal et al. ................. 198/312 |
| 7,543,700 | B2 | * | 6/2009 | Simke et al. .................. 198/835 |
| 8,960,418 | B2 | * | 2/2015 | Rathmann et al. ........... 198/835 |
| 2004/0124736 | A1 | | 7/2004 | Gauthier et al. |
| 2006/0066169 | A1 | * | 3/2006 | Daugherty ............... H02K 1/06 310/216.016 |
| 2014/0291126 | A1 | | 10/2014 | Becker et al. |

FOREIGN PATENT DOCUMENTS

| | | |
|---|---|---|
| CN | 1077545 | 1/2002 |
| CN | 2808824 | 8/2006 |
| CN | 2877141 | 3/2007 |
| CN | 201023934 | 2/2008 |
| CN | 201280334 Y * | 7/2009 |
| CN | 201573951 | 9/2010 |
| DE | 102006004421 A1 | 8/2006 |
| DE | 102008026243 | 12/2009 |
| EP | 1411620 | 4/2004 |
| EP | 11178487.2 | 8/2011 |
| EP | 2562102 | 2/2013 |
| WO | WO 9731854 A1 | 9/1997 |
| WO | 03/020620 A1 | 3/2003 |
| WO | 2010/037215 | 4/2010 |
| WO | PCT/EP2012/065123 | 8/2012 |

OTHER PUBLICATIONS

European Office Action for European Priority Patent Application No. 11178487.2, issued Jan. 23, 2012, 6 pages.
English Language International Search Report for PCT/EP2012/065123, mailed Sep. 20, 2012, 2 pages.
Steve Fiscor, "Xstrata Invests in Gearless Conveyor Drives," from Internet on Jun. 5, 2014: http://www.womp-int.com/story/2011vol05/story026.htm; 2011; pp. 1-9.
Abb OY, "Synchronous Motors," Brochure AMZ EN Aug. 2005, pp. 1-28.
Volkmar Wuschek, "Neuartige Antriebslösung verringert Energieaufwand bei der Kohleförderung," Energie & Automation, vol. 3/87, Mar. 1987, pp. 1-7.
Siemens AG, "Simine Con GD—Gearless Drive Conveyor System in Cooperation with ThyssenKrupp," 2011, pp. 1-6.
Steve Fiscor, "Xstrata Invests in Gearless Conveyor Drives," from Internet on Jun. 30, 2014: http://www.womp-int.com/story/2011vol05/story026.htm; pp. 1-4.
Drawings regarding direct drive (2 pages); Email regarding transfer of drawings from Jun. 27, 2000 (1 page); agreement of confidentiality from 2000 (5 pages).
Förderanlagen Magdeburg FAM "Erläuterung der getriebelosen Antriebe von Eimerkettenbaggern," pp. 1-2.
Siemens AG, Presse Bericht über die Ausrüstung von Eimerkettenbaggern mit getriebelosen Antrieben, Jul. 11, 2007, pp. 1-3.
Héctor Farias, Motors and Generators: Gearless Conveyor Drive—Synchronous Motor and Drive; Presentation ABB of Mar. 28, 2011, pp. 1-24.
Notice of Opposition for related European Patent Application No. 11178487.2, issued Dec. 12, 2014, 31 pages.
Notice of Opposition for related European Patent Application No. 11178487.2, issued Dec. 23, 2014, 22 pages.
Chinese Office Action for related Chinese Patent Application No. 2012800410039, issued Mar. 2, 2015, 14 pages.
Office Action dated May 18, 2015 in corresponding Columbian Patent Application No. 14-29698.
Office Action in corresponding Kazakh Application No. 2014/1536.1 dated Sep. 1, 2015, with German Translation.
Chinese Office Action dated Nov. 2, 2015 in corresponding Chinese Patent Application No. 201280041003.9, 16 pages.

* cited by examiner

BELT-CONVEYING INSTALLATION, METHOD FOR OPERATING THE SAME, AND USE THEREOF

CROSS REFERENCE TO RELATED APPLICATIONS

This application is based on and hereby claims priority to International Application No. PCT/EP2012/065123 filed on Aug. 2, 2012 and European Application No. 11178487.2 filed on Aug. 23, 2011, the contents of which are hereby incorporated by reference.

BACKGROUND

The invention relates to a belt-conveying installation for heavy industry and a method for operating such a belt-conveying installation.

Known belt-conveying installations may have at least one support structure, a conveying belt and at least one drive apparatus for driving the conveying belt. The drive apparatus in this case might include at least one drive shaft, at least one drive shaft bearing arrangement, at least one drive roller and at least one independently excited drive motor in the form of an alternating current synchronous motor which is fed by a frequency converter and has a stator and a rotor, wherein the drive shaft and the at least one drive motor are connected to one another without any gearing and wherein rotor and drive shaft are arranged coaxially. Such a belt-conveying installation is already installed at the Prosper-Haniel underground mine in Bottrop, Germany, for example, for the purpose of transporting extracted coal to the surface. A detailed description of this belt-conveying installation is disclosed in the company brochure entitled "Advanced Drive System Saves Up to 20% Energy" and published by Siemens Aktiengesellschaft (Order No. A19199-E273-B198-X-7600). The belt-conveying installation has two drive motors with a nominal power of more than 3000 kW each. The drive shaft for the conveying belt has at its end face a plurality of pegs, which are oriented parallel to the longitudinal axis of the drive shaft and onto which the rotor of the drive motor is laterally mounted.

A so-called direct drive is used here, no components being provided between drive motor(s) and drive shaft for the purpose of converting the rotational speed of the rotor into a different rotational speed of the drive shaft. The drive shaft therefore rotates at the same rotational speed as predetermined by the rotor or rotors. Both the drive shaft and the stator of the drive motor are arranged on a stable support structure in order to ensure that the gap dimension required for correct motor operation is maintained between rotor and stator. In such an application, the gap dimension between rotor and stator usually has a value of 5 to 15 mm. In order to ensure correct motor operation, an acceptable displacement between rotor and stator is usually in the range of 10 to 15% of the gap dimension.

The rotor used in this context due to the necessarily high nominal power of the drive motor weighs several tons, and therefore the bearings required for the drive shaft are so configured as to be correspondingly stable and the pegs on the end face of the drive shaft are subjected to an enormous load. Any change in the physical position of the belt-conveying installation in a mining operation therefore presents problems because the gap dimension must be reliably maintained at all times.

SUMMARY

One possible object is to specify a belt-conveying installation which has direct drive and in which the gap dimension between rotor and stator can be maintained with particular reliability, in particular even if the physical position of the belt-conveying installation is changed.

A further potential object is to specify a method for operating such a belt-conveying installation and the use thereof.

The inventors propose a belt-conveying installation comprising at least one support structure, a conveying belt and at least one drive apparatus for driving the conveying belt, wherein the drive apparatus comprises at least one drive shaft, at least one drive shaft bearing arrangement, at least one drive roller and at least one independently excited drive motor in the form of an alternating current synchronous motor which is fed by a frequency converter and has a stator and a rotor, wherein the drive shaft and the at least one drive motor are connected to one another without any gearing and wherein rotor and drive shaft are arranged coaxially, the object is achieved by guiding each drive shaft through at least one rotor.

A drive shaft is considered to be "guided through a rotor" in this case if, in the direction of the axis of rotation of the rotor, it
  projects beyond the rotor on both sides,
  projects beyond the rotor on one side and terminates flush with the rotor on the opposite side of the rotor, or
  extends into the rotor by more than 50% of the depth dimension thereof.

A "drive shaft" here is generally understood to mean a rotating or fixed shaft or spindle.

The belt-conveying installation according to the proposal does not employ a lateral arrangement of the rotor or rotors on a drive shaft using pegs as per the related art cited above. The proposed rotor surrounds the drive shaft, which can extend beyond it or terminate flush with it. Due to its dimensions, the massive drive shaft (usually a solid shaft) has a high degree of stiffness, which is necessary in order to stabilize the position of the rotor or rotors and hence maintain the required gap dimension. This prevents any deflection of the drive shaft and consequently any relative movement between rotor and drive shaft which could cause the gap dimension to change. This also allows trouble-free transport of a belt-conveying installation to a different physical position, e.g. in the context of extractive or mining operations, e.g. a mine, a sintering plant, a pelletizing plant, a port, etc.

Drive rollers such as those used here for the drive apparatus are often also referred to as driving drums. Belts of optionally reinforced plastic or textile materials, or metal, are preferably used as conveying belts. In this case, it is possible to use uniformly flexible belts or sectionally rigid belts such as slat conveyors or apron conveyors, for example. The surface of the conveying belt can be smooth or profiled, e.g. studded, etc.

In particular, a direct frequency converter or an indirect voltage converter is used as a frequency converter.

Such a belt-conveying installation is particularly suitable for heavy industry and in particular for the extractive or mining industry. In particular, it is used for the transport of all types of bulk materials.

In a particularly preferred first embodiment, the rotor encloses the drive shaft and is connected permanently by a mechanical device thereto, said drive shaft also being connected permanently by a mechanical device to the at least one drive roller. In this way, the rotor or rotors, the connected drive shaft and the at least one drive roller form a particularly stable combination, which can rotate as a whole about the longitudinal axis of the drive shaft.

Here and in the following, "permanently by a mechanical device" is understood to signify connections between components which cannot be rotated relative to each other. These connections may be positive or non-positive, and based on e.g. a threaded connection, wedging, shrinking on, etc.

In an alternative, second embodiment, the rotor is arranged to the side of the drive roller and is connected permanently by a mechanical device thereto. In this case, the drive roller connected to the rotor may be connected via at least one drive roller bearing arrangement to the drive shaft, which is so designed as to be fixed. The stator is preferably arranged on the fixed drive shaft in this type of configuration. Alternatively, the drive roller connected to the rotor may be connected permanently by a mechanical device to the drive shaft, wherein the drive shaft is rotatably supported by the at least one drive shaft bearing arrangement and the stator is connected permanently by a mechanical device to at least one drive shaft bearing arrangement. These versions ensure that the required gap dimension between rotor and stator is reliably maintained.

In a further satisfactory configuration of the first embodiment, the drive shaft is rotatably supported by the at least one drive shaft bearing. In this case, the stator is preferably connected permanently by a mechanical device by a mechanical device to at least one drive shaft bearing arrangement. Alternatively, the stator is connected permanently by a mechanical device by a mechanical device to the support structure and also via at least one stator bearing arrangement to the rotatable drive shaft, e.g. via a torque stay rod. These versions likewise ensure that the required gap dimension between rotor and stator is reliably maintained.

If the drive shaft is so supported by the at least one drive shaft bearing arrangement as to be rotatable, the drive shaft is advantageously designed as two parts in a longitudinal direction, resulting in a first drive shaft section assigned to the drive roller and a second drive shaft section assigned to the drive motor, said sections being interconnected via an elastic coupling device. The elastic coupling ensures an identical rotational speed of rotor and drive shaft, yet allows a slight change in the longitudinal axis of the first drive shaft section relative to the longitudinal axis of the second drive shaft section in this case, thereby ensuring a constant gap dimension between rotor and stator.

In this case, the term "elastic" does not signify that the coupling arrangement must always comprise a component which is made of an elastic material. Rather, it is meant that any relative axial or angular misalignment of the two drive shaft sections can be equalized. A preferred elastic coupling arrangement takes the form of a curved-tooth gear coupling, for example.

The coupling device in this case is advantageously arranged between a drive shaft bearing arrangement and a stator bearing arrangement which is arranged adjacently thereto. Ease of access to the coupling device is therefore possible. This is relevant for servicing and maintenance of the belt-conveying installation in particular. These versions likewise ensure that the required gap dimension between rotor and stator is reliably maintained.

In an alternative embodiment of the first embodiment, in which the stator is connected permanently by a mechanical device by a mechanical device to the support structure and is also connected via at least one stator bearing arrangement to the rotatable drive shaft, the drive shaft is preferably formed as two parts in the longitudinal direction, resulting in a first drive shaft section assigned to the drive roller and a second drive shaft section assigned to the drive motor, said sections being interconnected via an articulated device. The articulated device in this case is preferably arranged between a drive shaft bearing arrangement and a stator bearing arrangement, in order to allow ease of access to the articulated device. This is relevant for the servicing and maintenance of the belt-conveying installation in particular.

Alternatively, the articulated device can also be arranged between two stator bearing arrangements. The articulated arrangement is preferably moved into the interior of a motor housing of the drive motor in this case. The articulated device is therefore so arranged as to be protected from the harsh external environmental conditions which are generally prevalent in operations associated with heavy industry. However, the articulated device is harder to access there. These versions likewise ensure that the required gap dimension between rotor and stator is reliably maintained.

In a particularly satisfactory configuration, the support structure of the belt-conveying installation includes a supporting framework which comprises at least one transport device for changing the physical position of the belt-conveying installation. This allows the complete belt-conveying installation to be transported to a different application site. By virtue of the robust design of the drive apparatus, such a change of location does not result in the drive motor being damaged as a consequence of failing to maintain the required gap dimension.

In a satisfactory configuration, the transport device has skids and/or wheels in this case. If skids or non-driven wheels are used, a separate traction engine is usually required in order to pull the belt-conveying installation to another location in a sliding or rolling manner.

In a further satisfactory configuration, wheels that are provided can be driven by at least one drive module which is attached to the supporting framework.

Alternatively or in combination with skids and/or wheels that are provided, the at least one transport device may have crawler treads, which can usually then be driven by at least one drive module which is attached to the supporting framework. In either case, the belt-conveying installation is able to change its physical position autonomously. The drive module(s) may be controlled via remote control in this case, or a cab for operating personnel may be provided in the region of the supporting framework, such that the movement of the belt-conveying installation includes the operating personnel controlling the transport.

It is however clear that belt-conveying installations can also be embodied without a transport device, and therefore conventional relocation of the system by a crane or a crawler is possible.

The space required for the drive apparatus is reduced as a result of the compact structural design, thereby simplifying the transport of the belt-conveying installation and allowing a belt-conveying installation to be used in application sites having difficult spatial environments.

The independently excited drive motor preferably has a nominal power in the range of 1 to 8 MW and is suitable for outdoor use where environmental temperatures in the range of −40° C. to +50° C. must be tolerated. The rotor of a drive motor preferably rotates at a rotational speed in the range of up to 80 revolutions per minute and in particular in the range of 30 to 70 revolutions per minute during operation, in particular for extractive or mining applications. The rotational speed can be adjusted or changed at any time during operation of the belt-conveying installation by the frequency converter.

The object is also achieved in respect of the method for operating a belt-conveying installation, wherein the conveying belt is operated at a delivery speed of less than 13 m/s, preferably at a delivery speed in the range of 3 to 10 m/s, in particular in the range of 3 to 8 m/s. As a result of using a frequency converter, the delivery speed can be adapted to the usual delivery speeds for belt-conveying installations in extractive or mining operations.

The physical position of the belt-conveying installation is preferably changed using the at least one transport device. The belt-conveying installation is therefore mobile and can be deployed quickly and easily in different locations as required.

A belt-conveying installation is ideally used in heavy industry, in particular in the extractive or mining industry for the delivery of material, in particular bulk materials, at a speed of less than 13 m/s, preferably at a speed in the range of 3 to 10 m/s, in particular in the range of 3 to 8 m/s.

In particular, the belt-conveying installation is advantageously used in mining operations, sintering plants, pelletizing plants or ports.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
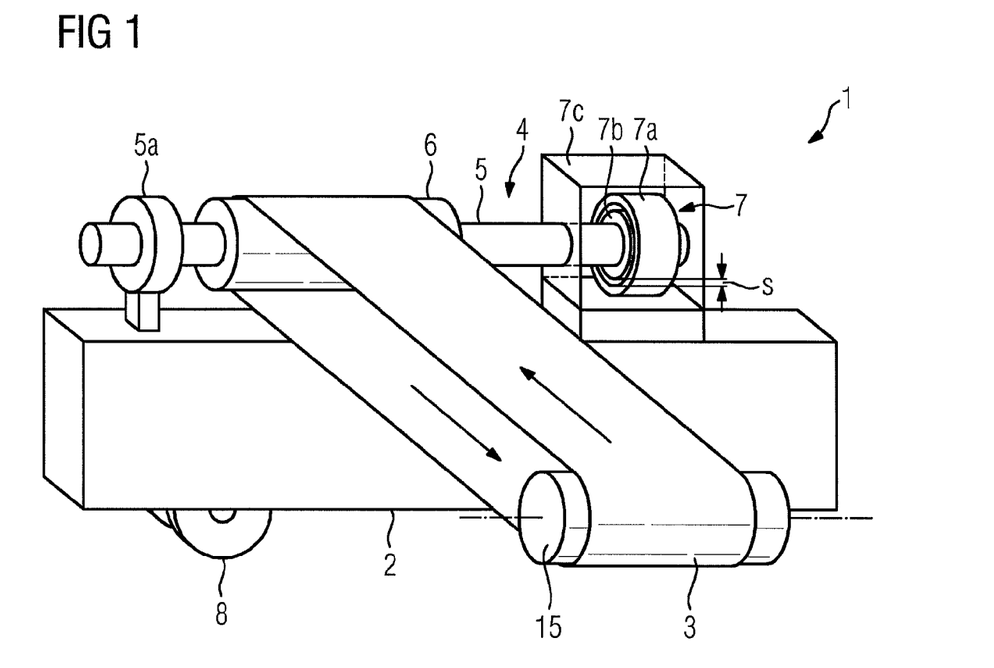
FIG. 1 schematically shows a belt-conveying installation in a three-dimensional view, FIG. 2 schematically shows a first drive apparatus for a belt-conveying installation in longitudinal section, FIG. 3 schematically shows a second drive apparatus for a belt-conveying installation in longitudinal section, FIG. 4 schematically shows a third drive apparatus for a belt-conveying installation in longitudinal section, FIG. 5 schematically shows a fourth drive apparatus for a belt-conveying installation in longitudinal section, FIG. 6 schematically shows a fifth drive apparatus for a belt-conveying installation in longitudinal section, FIG. 7 schematically shows a sixth drive apparatus for a belt-conveying installation in longitudinal section, FIG. 8 schematically shows a seventh drive apparatus for a belt-conveying installation in longitudinal section, and FIG. 9 schematically shows an eighth drive apparatus for a belt-conveying installation in longitudinal section.

FIG. 1 schematically shows a purely exemplary belt-conveying installation 1 for heavy industry, particularly for the extractive or mining industry, in a three-dimensional view. The belt-conveying installation 1 comprises a support structure 2, a conveying belt 3 and a drive apparatus 4 for driving the conveying belt 3. Also provided is at least one tail-end roller 15, which can also be driven and can function as a further drive roller. The drive apparatus 4 comprises a drive shaft 5, at least one drive shaft bearing arrangement 5a, a drive roller 6 and an independently excited drive motor 7 in the form of an alternating current synchronous motor which is fed by a frequency converter and has a stator 7a and a rotor 7b. The rotor 7b and the stator 7a, illustrated schematically in section, are situated in a motor housing 7c which is partially transparent in this illustration. The drive shaft 5 and the drive motor 7 are connected to one another without any gearing, rotor 7b and drive shaft 5 being arranged coaxially. The drive shaft 5 is guided through the rotor 7b. The drive shaft 5 projects beyond the rotor 7b here. However, the drive shaft 5 can also terminate flush with the rotor 7b or within the rotor 7b, provided the rotor 7b for the most part surrounds the drive shaft 5. The distance between the stator 7a and the rotor 7b is referred to as gap dimension S, and maintenance thereof is critical to the correct operation of the drive motor 7. A further drive motor can optionally be arranged on the drive shaft 5, on the side facing away from the drive motor 7. The arrangement of further drive rollers 6 on the drive shaft 5 is also possible.

For the purpose of changing the physical position of the belt-conveying installation, provision is optionally made for a transport device 8 having wheels which allow the belt-conveying installation to be pulled by a separate traction engine, or moved by a drive that is provided for the wheels, to a different installation location. Alternatively or in combination with the wheels, the transport device 8 can also be equipped with skids and/or crawler treads.

By way of example, the following FIGS. 2 to 9 show details of suitable drive apparatuses for a belt-conveying installation.

Figure 2:
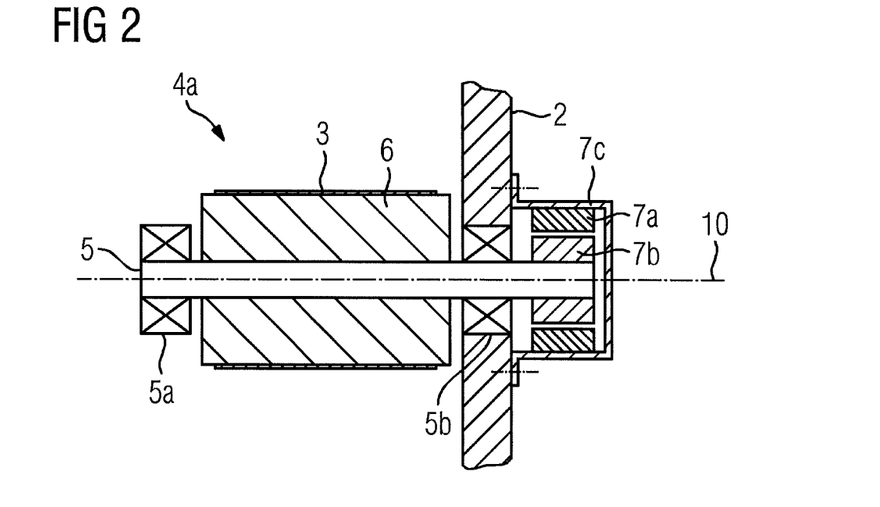

FIG. 2 schematically shows a first drive apparatus 4a for a belt-conveying installation in longitudinal section. The first drive apparatus 4a comprises a drive shaft 5, two drive shaft bearing arrangements 5a, 5b, a drive roller 6 and an independently excited drive motor 7 in the form of an alternating current synchronous motor which is fed by a frequency converter and has a stator 7a and a rotor 7b. The drive roller 6 is made of solid material here, but can equally be hollow. The rotor 7b and the stator 7a are situated in a motor housing 7c, which is connected permanently by a mechanical device by a mechanical device to the stator 7a and also to the support structure 2. The drive shaft 5 and the drive motor 7 are connected to one another without any gearing, rotor 7b and drive shaft 5 being arranged coaxially. The drive shaft 5 is guided through the rotor 7b and terminates flush with the same on that side of the rotor 7b which faces away from the drive roller 6. However, the drive shaft 5 can equally project beyond the rotor 7b or terminate within the rotor 7b, provided the rotor 7b for the most part fits on the drive shaft 5. The rotor 7b encloses the drive shaft 5 and is connected permanently by a mechanical device by a mechanical device thereto, said drive shaft 5 also being connected permanently by a mechanical device by a mechanical device to the drive roller 6. The rotor 7b, the drive shaft 5 and the drive roller 6 consequently form a unit which can rotate about the longitudinal axis 10 of the drive shaft. This structural format of the first drive apparatus 4a is particularly compact and therefore saves space. It allows drive roller 6 and drive motor 7 to be supported by the two drive shaft bearing arrangements 5a, 5b. The gap dimension S (cf. FIG. 1) between stator 7a and rotor 7b is particularly reliably maintained, since the position of stator 7a and rotor 7b is essentially only dependent on the mounting of the drive shaft 5.

Figure 3:
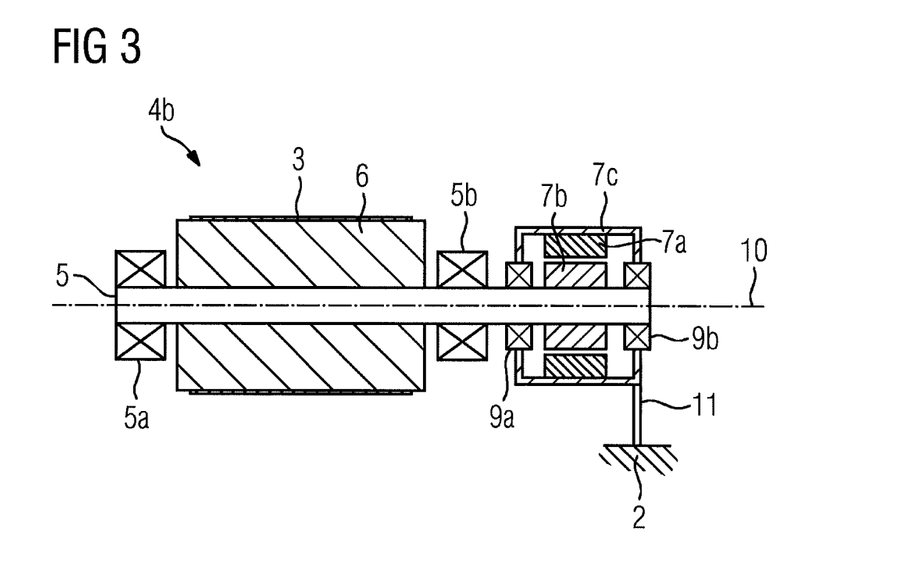

FIG. 3 schematically shows a second drive apparatus 4b for a belt-conveying installation in longitudinal section. The second drive apparatus 4b comprises a drive shaft 5, two drive shaft bearing arrangements 5a, 5b, a drive roller 6 and an independently excited drive motor 7 in the form of an alternating current synchronous motor which is fed by a frequency converter and has a stator 7a and a rotor 7b. The drive roller 6 is made of solid material here, but can equally be hollow. The rotor 7b and the stator 7a are situated in a motor housing 7c, which is connected permanently by a mechanical device by a mechanical device to the stator 7a and also via a torque stay rod 11 to the support structure 2. The stator 7a is mounted on the rotatable drive shaft 5 via the motor housing 7c by stator bearing arrangements 9a, 9b. Without the torque stay rod 11, the stator 7a would be able to rotate with the motor housing 7c on the drive shaft 5. The drive shaft 5 and the drive motor 7 are connected to one another without any gearing, rotor 7b and drive shaft 5 being arranged coaxially. The drive shaft 5 is guided through the rotor 7b and projects beyond this. The rotor 7b encloses the drive shaft 5 and is connected permanently by a mechanical device by a mechanical device thereto, the drive shaft 5 also being connected permanently by a mechanical device by a mechanical device to the drive roller 6. The rotor 7b, the drive shaft 5 and the drive roller 6 consequently form a unit which can rotate about the longitudinal axis 10 of the drive shaft. The gap dimension S (cf. FIG. 1) between stator 7a and rotor 7b is particularly reliably maintained, since the drive motor 7 is transferred completely onto the drive shaft 5. This structural format has the additional advantage that the bearing arrangements are readily accessible for servicing purposes.

Figure 4:
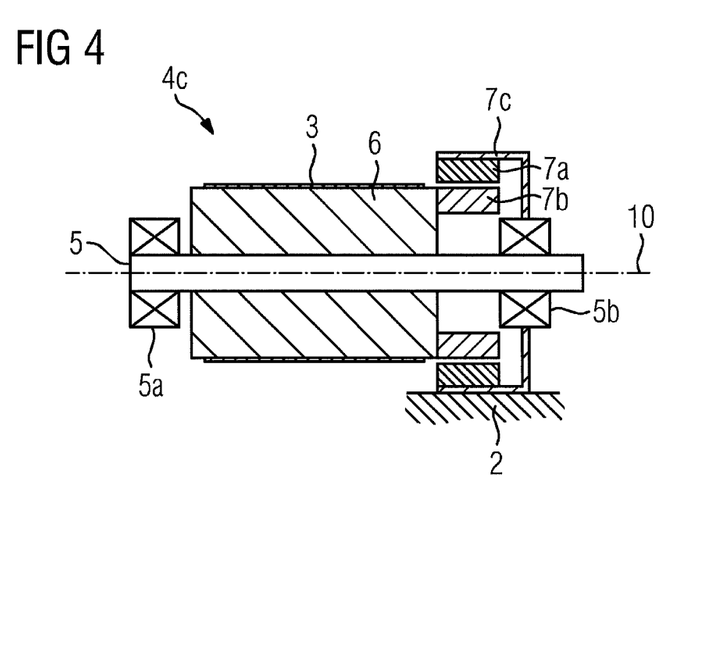

FIG. 4 schematically shows a third drive apparatus 4c for a belt-conveying installation in longitudinal section. The third drive apparatus 4c comprises a drive shaft 5, two drive shaft bearing arrangements 5a, 5b, a drive roller 6 and an independently excited drive motor 7 in the form of an alternating current synchronous motor which is fed by a frequency converter and has a stator 7a and a rotor 7b. The drive roller 6 is made of solid material here, but can equally be hollow. The rotor 7b and the stator 7a are situated in a motor housing 7c, which is connected permanently by a mechanical device by a mechanical device to the stator 7a and also to the support structure 2. The drive shaft bearing arrangement 5b is arranged on the motor housing 7c in this case. The drive shaft 5 and the drive motor 7 are connected to one another without any gearing, rotor 7b and drive shaft 5 being arranged coaxially. The drive shaft 5 is guided through the rotor 7b and projects beyond this. The rotor 7b is arranged to the side of the drive roller 6 and is connected permanently by a mechanical device by a mechanical device thereto. The drive shaft 5 and the drive roller 6 are also interconnected permanently by a mechanical device. The rotor 7b, the drive shaft 5 and the drive roller 6 consequently form a unit which can rotate about the longitudinal axis 10 of the drive shaft. The gap dimension S (cf. FIG. 1) between stator 7a and rotor 7b is particularly reliably maintained, since the drive motor 7 is likewise here transferred completely onto the drive shaft 5. Only two bearing arrangements in total are required. This is advantageous with regard to the availability and servicing of the bearing arrangements. This structural format has the additional advantage that the bearing arrangements are readily accessible for servicing purposes.

Figure 5:
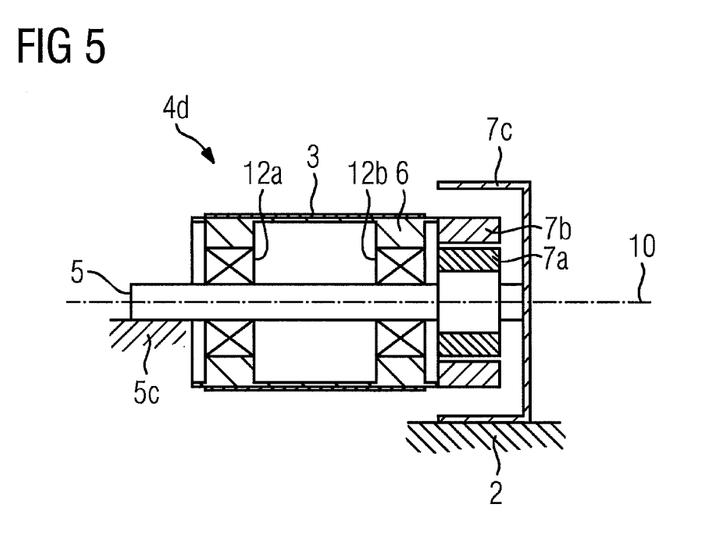

FIG. 5 schematically shows a fourth drive apparatus 4d for a belt-conveying installation in longitudinal section. The fourth drive apparatus 4d comprises a drive shaft 5, a drive shaft bearing arrangement 5c, a drive roller 6 and an independently excited drive motor 7 in the form of an alternating current synchronous motor which is fed by a frequency converter and has a stator 7a and a rotor 7b. The rotor 7b and the stator 7a are situated in a motor housing 7c, which is connected permanently by a mechanical device by a mechanical device to the support structure 2. In this case, the drive shaft 5 at its end which faces away from the drive shaft bearing arrangement 5c is fastened to the motor housing 7c and is therefore so designed as to be not rotatable but fixed. The stator 7a is arranged on the fixed drive shaft 5 and encloses it. In a preferred embodiment, the drive shaft bearing arrangement 5c can be formed by the support structure 2 itself. The drive shaft 5 and the drive motor 7 are connected to one another without any gearing, rotor 7b, stator 7a and drive shaft 5 being arranged coaxially. The drive shaft 5 is guided through the rotor 7b and projects beyond this. The rotor 7b is arranged to the side of the drive roller 6 and connected permanently by a mechanical device by a mechanical device thereto. The drive roller 6 connected to the rotor 7b is connected via two drive roller bearing arrangements 12a, 12b to the drive shaft 5, which is so designed as to be fixed. The rotor 7b and the drive roller 6 with the drive roller bearing arrangements 12a, 12b consequently form a unit which can rotate about the drive shaft 5. The gap dimension S (cf. FIG. 1) between stator 7a and rotor 7b is particularly reliably maintained, since it is essentially only dependent on the mounting of the drive roller 6.

Figure 6:
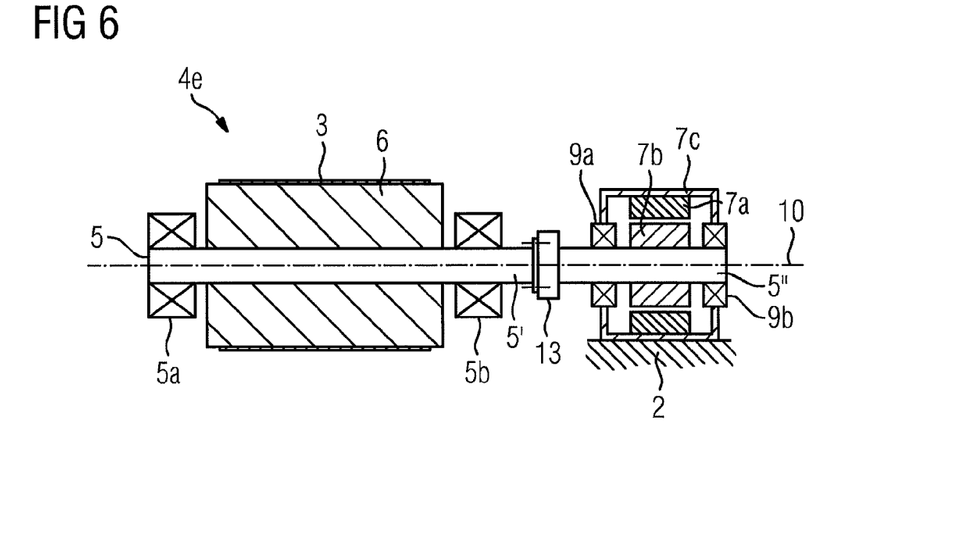

FIG. 6 schematically shows a fifth drive apparatus 4e for a belt-conveying installation in longitudinal section. In this case, the fifth drive apparatus 4e resembles the second drive apparatus 4b as per FIG. 3. Reference characters identical to those in FIG. 3 identify identical elements. The drive roller 6 is made of solid material here, but can equally be hollow. In contrast with the second drive apparatus 4b, the motor housing 7c here is directly connected to the support structure 2. The drive shaft 5 is designed as two parts in a longitudinal direction, resulting in a first drive shaft section 5' assigned to the drive roller 6 and a second drive shaft section 5" assigned to the drive motor 7. The first drive shaft section 5' and the second drive shaft section 5" are interconnected via an elastic coupling device 13. For greater clarity in this case, the coupling device 13 is illustrated in profile rather than in longitudinal section like the rest of the fifth drive apparatus 4e. The coupling device 13 is arranged between one of the drive shaft bearing arrangements 5b and a stator bearing arrangement 9a which is arranged adjacently thereto. The gap dimension S (cf. FIG. 1) between stator 7a and rotor 7b is again maintained particularly reliably here, since it is essentially only dependent on the mounting of the second drive shaft section 5". Slight positional deviations of the first drive shaft section 5' from the longitudinal axis 10 of the drive shaft are tolerated as a result of the elastic coupling device 13. This structural format has the additional advantage that the bearing arrangements are readily accessible for servicing purposes.

Figure 7:
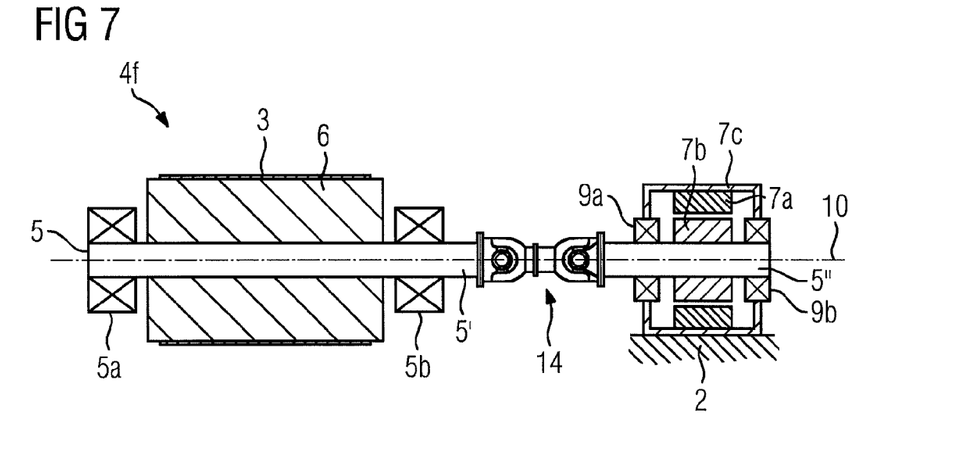

FIG. 7 schematically shows a sixth drive apparatus 4f for a belt-conveying installation in longitudinal section. In this case, the sixth drive apparatus 4f resembles the fifth drive apparatus 4e as per FIG. 6. Reference characters identical to those in FIG. 6 identify identical elements. The drive roller 6 is made of solid material here, but can equally be hollow. In contrast with the fifth drive apparatus 4e, an articulated device 14 is provided instead of the elastic coupling device 13. For greater clarity in this case, the articulated device 14 is illustrated in profile rather than in longitudinal section like the rest of the sixth drive apparatus 4f. The articulated device 14 is arranged between one of the drive shaft bearing arrangements 5b and a stator bearing arrangement 9a which is arranged adjacently thereto. The gap dimension S (cf. FIG. 1) between stator 7a and rotor 7b is again maintained particularly reliably here, since it is essentially only dependent on the mounting of the second drive shaft section 5". Even significant positional deviations of the first drive shaft section 5' from the longitudinal axis 10 of the drive shaft are tolerated as a result of the articulated device 14. This structural format has the additional advantage that the bearing arrangements are readily accessible for servicing purposes.

Figure 8:
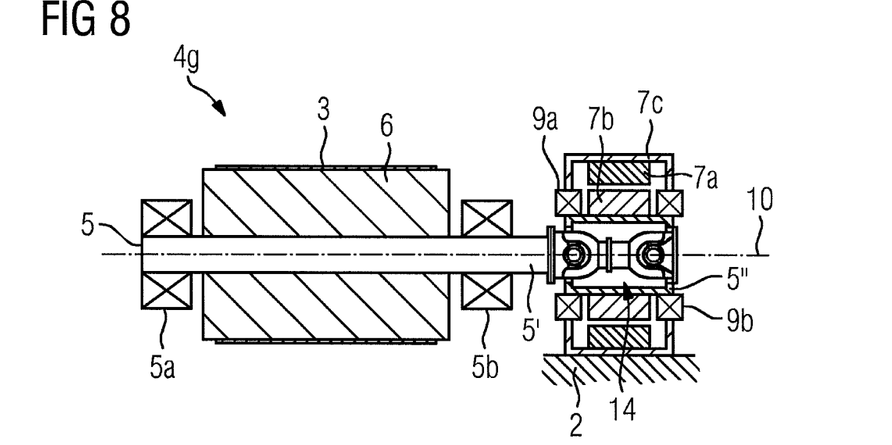

FIG. 8 schematically shows a seventh drive apparatus 4g for a belt-conveying installation in longitudinal section. In this case, the seventh drive apparatus 4g resembles the sixth drive apparatus 4f as per FIG. 7. Reference characters identical to those in FIG. 7 identify identical elements. The drive roller 6 is made of solid material here, but can equally be hollow. In contrast with the sixth drive apparatus 4f, the articulated device 14 is arranged in the motor housing 7c, or essentially between the two stator bearing arrangements 9a, 9b, being situated in a hollow second drive shaft section 5". For greater clarity in this case, the articulated device 14 is illustrated in profile rather than in longitudinal section like the rest of the seventh drive apparatus 4g. In addition to the advantages of the sixth embodiment, this structural format has the further advantage of being particularly compact and saving space.

Figure 9:
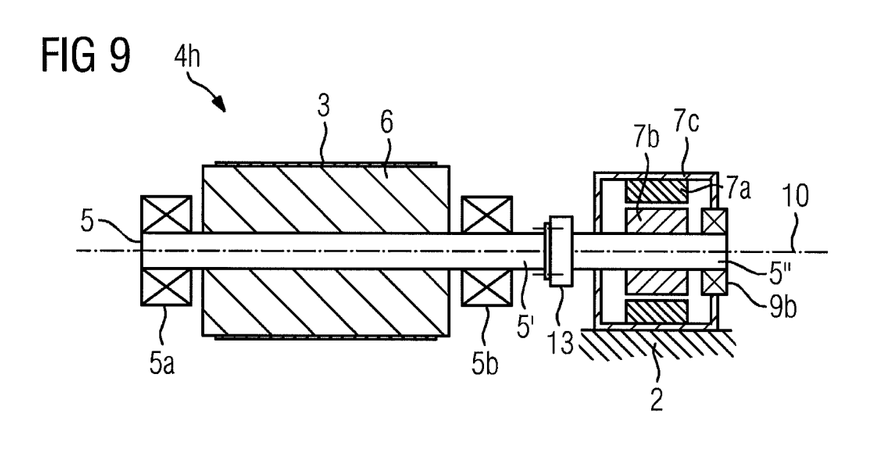

FIG. 9 schematically shows an eighth drive apparatus 4h for a belt-conveying installation in longitudinal section. In this case, the eighth drive apparatus 4h resembles the fifth drive apparatus 4e as per FIG. 6. Reference characters identical to those in FIG. 6 identify identical elements. The drive roller 6 is made of solid material here, but can equally be hollow. The motor housing 7c is directly connected to the support structure 2. The drive shaft 5 is designed as two parts in a longitudinal direction, resulting in a first drive shaft section 5' assigned to the drive roller 6 and a second drive shaft section 5" assigned to the drive motor 7. The first drive shaft section 5' and the second drive shaft section 5" are interconnected via an elastic coupling device 13. For greater clarity in this case, the coupling device 13 is illustrated in profile rather than in longitudinal section like the rest of the eighth drive apparatus 4h. The coupling device 13 is arranged between one of the drive shaft bearing arrangements 5b and a stator bearing arrangement 9b which is arranged adjacently thereto. In contrast with the fifth drive apparatus 4e, however, only one stator bearing arrangement 9b is provided here. The seal between the second drive shaft section 5" and the motor housing 7c is provided on that side of the second drive shaft section 5" facing the coupling device 13 by a seal arrangement, not illustrated in detail here, which prevents dust or other environmental influences from reaching the interior of the motor housing 7c. The gap dimension S (cf. FIG. 1) between stator 7a and rotor 7b is essentially maintained again here. Slight positional deviations of the first drive shaft section 5' from the longitudinal axis 10 of the drive shaft are to a large extent tolerated as a result of the elastic coupling device 13. This structural format has the advantage that the bearing arrangements are readily accessible for servicing purposes.

In view of the harsh operating conditions of the belt-conveying installation, particularly in heavy industry and above all in the delivery of bulk materials, more stringent requirements apply generally to the sealing of bearing arrangements, drive rollers and drive motor(s) against dust and environmental influences. Structural designs featuring encapsulation are preferred here. Explosion-proof variants of drive motors are used if the belt-conveying installation is to be deployed underground.

The FIGS. 1 to 9 show merely exemplary belt-conveying installations and their drive apparatuses. Therefore a belt-conveying installation may also comprise a plurality of drive shafts, drive rollers and drive motors, and a large number of tail-end rollers or guide devices.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A belt-conveying installation for heavy industry, comprising:
   a support structure;
   a conveying belt; and
   a drive apparatus to drive the conveying belt, the drive apparatus comprising: a drive roller driving the conveyor belt in rotation;
   an independently excited drive motor in the form of an alternating current synchronous motor which is fed by a frequency converter, is supported by the supporting structure, and has a stator and a rotor;
   a drive shaft rotating the drive roller, connected to the drive motor without any gearing, and rotated by the drive motor, the drive shaft and the rotor being arranged coaxially, the drive shaft being guided through the rotor; and
   a drive shaft bearing arrangement supporting the drive shaft,
   wherein the rotor of the drive motor is configured to rotate at a rotational speed up to 80 revolutions per minute for extracting or mining applications.

2. The belt-conveying installation as claimed in claim 1, wherein the rotor encloses the drive shaft,
   the rotor is mechanically permanently connected to the drive shaft, and the drive shaft is mechanically permanently connected to the drive roller.

3. The belt-conveying installation as claimed in claim 2, wherein the drive shaft is rotatably supported by the drive shaft bearing arrangement.

4. The belt-conveying installation as claimed in claim 3, wherein the stator is mechanically permanently connected to the drive shaft bearing arrangement.

5. The belt-conveying installation as claimed in claim 3, wherein the stator is mechanically permanently connected to the support structure, and the stator is also connected via at a stator bearing arrangement to the drive shaft.

6. The belt-conveying installation as claimed in claim 5, wherein
   the drive shaft is longitudinally separated into first and second drive shaft sections,
   the first drive shaft section is connected to the drive roller,
   the second drive shaft section is connected to the drive motor, and
   the first and second drive shaft sections are interconnected via an elastic coupling device.

7. The belt-conveying installation as claimed in claim 6, wherein
   a stator bearing arrangement supports the stator and is arranged adjacent to the drive shaft bearing arrangement, and
   the elastic coupling device is arranged between the drive shaft bearing arrangement and the stator bearing arrangement.

8. The belt-conveying installation as claimed in claim 5, wherein
   the drive shaft is longitudinally separated into first and second drive shaft sections, the first drive shaft section is connected to the drive roller,
the second drive shaft section is connected to the drive motor, and
the first and second drive shaft sections are interconnected via an articulated device.

9. The belt-conveying installation as claimed in claim 8, wherein a stator bearing arrangement supports the stator, and
the articulated device is arranged between the drive shaft bearing arrangement and the stator bearing arrangement.

10. The belt-conveying installation as claimed in claim 8, wherein a stator bearing arrangement comprises two stator bearings, and
the articulated device is arranged between the two stator bearings.

11. The belt-conveying installation as claimed in claim 1, wherein the rotor is arranged to the side of the drive roller, and the rotor is mechanically permanently connected to the drive roller.

12. The belt-conveying installation as claimed in claim 11,
wherein the drive roller, which is connected to the rotor, is connected via at least one drive roller bearing arrangement to the drive shaft, and
the drive shaft is fixed.

13. The belt-conveying installation as claimed in claim 12, wherein the stator is arranged on the drive shaft, which is fixed.

14. The belt-conveying installation as claimed in claim 11, wherein
the drive roller, which is connected to the rotor, is mechanically permanently connected to the drive shaft,
the drive shaft is rotatably supported by the drive shaft bearing arrangement, and the stator is mechanically permanently connected to the drive shaft bearing arrangement.

15. The belt-conveying installation as claimed in claim 1, wherein the support structure comprises a support framework and a transport device to move the belt-conveying installation from one location to another.

16. The belt-conveying installation as claimed in claim 15, wherein the transport device comprises skids and/or wheels.

17. The belt-conveying installation as claimed in claim 16, wherein the wheels are driven by a drive module attached to the support framework.

18. The belt-conveying installation as claimed in claim 15, wherein the transport device comprises crawler treads.

19. The belt-conveying installation as claimed in claim 1, wherein the drive motor, the drive shaft and the drive roller are mounted to move together and maintain a predetermined gap between the stator and rotor.

20. The belt-conveying installation as claimed in claim 1, wherein the rotor of the drive motor rotates during operation at the rotational speed in a range of 30-70 revolutions per minute.

21. A method comprising:
operating a conveying belt of a belt-conveying installation, at a delivery speed of less than 13 m/s, the belt-conveying installation, comprising: a support structure; and
a drive apparatus to drive the conveying belt, the drive apparatus comprising; a drive roller driving the conveyor belt in rotation;
an independently excited drive motor in the form of an alternating current synchronous motor which is fed by a frequency converter and has a stator and a rotor;
a drive shaft rotating the drive roller, connected to the drive motor without any gearing, and rotated by the drive motor, the drive shaft and the rotor being arranged coaxially, the drive shaft being guided through the rotor; and a drive shaft bearing arrangement rotatably supporting the drive shaft,
wherein the rotor of the drive motor is configured to rotate at a rotational speed up to 80 revolutions per minute for extracting or mining applications.

22. The method as claimed in claim 21, further comprising a transport device to move the belt-conveying installation from one location to another.

23. The method as claimed in claim 21, wherein the rotor of the drive motor rotates during operation at the rotational speed in a range of 30-70 revolutions per minute.

24. A material extraction method comprising: receiving an extracted material;
loading the extracted material on a conveying belt;
driving a drive roller on which the conveying belt is mounted to rotate the conveying belt, with a drive apparatus, the drive apparatus comprising:
an independently excited drive motor in the form of an alternating current synchronous motor which is fed by a frequency converter and has a stator and a rotor;
a drive shaft rotating the drive roller, connected to the drive motor without any gearing, and rotated by the drive motor, the drive shaft and the rotor being arranged coaxially, the drive shaft being guided through the rotor; and a drive shaft bearing rotatably supporting the drive shaft; and delivering the extracted material on the conveying belt at a speed of less than 13 m/s,
wherein the rotor of the drive motor is configured to rotate at a rotational speed up to 80 revolutions per minute for extracting or mining applications.

25. A material extraction method of claim 24, wherein the rotor of the drive motor rotates during operation at the rotational speed in a range of 30-70 revolutions per minute.

* * * * *